US008704956B2

(12) United States Patent
Seo et al.

(10) Patent No.: US 8,704,956 B2
(45) Date of Patent: Apr. 22, 2014

(54) APPARATUS AND METHOD FOR CONTROLLING INFRASTRUCTURE BASED ON BROADCASTING SIGNALS

(75) Inventors: Jae-Hyun Seo, Daejeon (KR); Hyoungsoo Lim, Daejeon (KR); Heung-Mook Kim, Daejeon (KR); Soo-In Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 58 days.

(21) Appl. No.: 13/132,221

(22) PCT Filed: Dec. 2, 2009

(86) PCT No.: PCT/KR2009/007174

§ 371 (c)(1),
(2), (4) Date: Jun. 1, 2011

(87) PCT Pub. No.: WO2010/064850

PCT Pub. Date: Jun. 10, 2010

(65) Prior Publication Data

US 2011/0234901 A1 Sep. 29, 2011

(30) Foreign Application Priority Data

Dec. 2, 2008 (KR) ........................ 10-2008-0121195
Apr. 30, 2009 (KR) ........................ 10-2009-0038475

(51) Int. Cl.
*H04N 5/38* (2006.01)

(52) U.S. Cl.
USPC ............ 348/723; 348/474; 348/725; 348/734

(58) Field of Classification Search
USPC ......... 348/723, 725, 729, 614, 611, 734, 552, 348/474; 725/10, 9, 33, 80
IPC ........................................................ H04N 5/38
See application file for complete search history.

(56) References Cited

U.S. PATENT DOCUMENTS 5,815,219 A * 9/1998 Okuizumi ..................... 348/725
6,498,617 B1 * 12/2002 Ishida et al. .................. 347/252
7,155,305 B2 * 12/2006 Hayes et al. .................. 700/224
8,321,885 B2 * 11/2012 Pino et al. ....................... 725/12

FOREIGN PATENT DOCUMENTS

EP 1 732 261 A1 12/2006
KR 2003-0010342 2/2003
KR 10-2005-0015511 2/2005
KR 10-2006-0008113 1/2006
KR 10-2006-0076359 8/2008
WO 2008/100046 A1 8/2008

OTHER PUBLICATIONS

International Search Report for PCT/KR2009/007174, mailed May 20, 2010.

* cited by examiner

*Primary Examiner* — Trang U Tran
(74) *Attorney, Agent, or Firm* — Staas & Halsey LLP

(57) ABSTRACT

An apparatus for transmitting broadcasting content including a control signal in a broadcasting network, the apparatus includes: a modulator configured to modulate broadcasting content by a predetermined modulation method; a control signal generator configured to generate a control signal for remote control of infrastructure; an adder configured to add the control signal to the modulated broadcasting content; and a DTV transmitter configured to convert the added signal to a DTV broadcasting signal and transmit the DTV broadcasting signal.

5 Claims, 4 Drawing Sheets

APPARATUS AND METHOD FOR CONTROLLING INFRASTRUCTURE BASED ON BROADCASTING SIGNALS

TECHNICAL FIELD

The present invention relates to an apparatus and system for transmitting/receiving a broadcasting signal; and, more particularly, to an apparatus and system for transmitting/receiving a broadcasting signal including an additional signal.

BACKGROUND ART

A television (TV) broadcasting system is now a situation that analog broadcasting and digital broadcasting are mixed. An analog TV system is very developing to broadcasting based on color from early broadcasting based on black and white. However, the analog broadcasting has shortcomings of transmission/reception difficulty, noise effect, and the like. Thus, interest of a digital TV system is increasing. Then, in the current territorial TV broadcasting system, a conventional analog broadcasting signal coexists with a digital broadcasting signal that Digital Multimedia Broadcasting (DMB) stands first on the list. In the territorial TV broadcasting, importance of digital broadcasting is increasing due to sudden increase of equipments that may receive the digital broadcasting signal, efficiency of the digital broadcasting method and stable transmission/reception of a broadcasting signal.

A digital TV (DTV) means a TV broadcasting system that processes all broadcastings of production, edition, transmission and reception by using a digital signal. Because the digital TV processes a different signal according to kind of information, the digital TV can overcome shortcomings of the analog TV that has low picture quality and sound quality and allows the user to see contents of only limited channel. The digital TV can remove noise, reduce overlap of a screen and provide more clean picture and voice than the conventional analog TV by using digital transmission technology. The digital TV can provide much more number of channels by compressing a signal without loss of information. Also, the digital TV can automatically correct a signal error that happens at a transmission process. The digital TV can share TV program and contents stored on Internet, and the like. There is advantage that the digital TV is available interactive communication with a user including internet search through TV. DTV method is divided into the American method, Advanced Television Systems Committee (ATSC), and the European method, Digital Video Broadcasting-Terrestrial (DVB-T). In ATSC, 8-level Vestigial SideBand (8-VSB) is used as a modulation method, and in DVB-T, Coded Orthogonal Frequency Division Multiplexing (COFDM) method is used as a modulation method.

Also, digitization of the broadcasting can secure good picture quality and sound quality and increase channel efficiency quadruple than an analog broadcasting system. In a viewer's side, digitization of the broadcasting can provide a high quality broadcasting service that is difficult to express in the analog broadcasting method, and can permit seeing and hearing of various programs provided through multi channels. In industrial side, digitization of the broadcasting can bring demand creation effect due to popularization of a digital broadcasting transmitter/receiver and popularization of new contents. Territorial DTV among the digital broadcasting systems is installed all over the country and now developing to country's basic network.

Hereinafter, the DTV transmission and reception system will be described with reference to the drawings.

FIG. 1 is a block diagram illustrating a DTV transmission system for transmitting a DTV broadcasting signal. The DTV transmission system of FIG. 1 has the same structure with prior DTV transmission system for transmitting a DTV broadcasting signal.

As shown, the DTV transmission system includes a broadcasting content provider 101, a modulator 102, a DTV transmitter 103 and a transmission antenna 104. The broadcasting content provider 101 receives broadcasting contents. The modulator 102 modulates the received broadcasting contents. The DTV transmitter 103 transmits the modulated signal. The transmission antenna 104 receives a data from the DTV transmitter 103 and transmits the received data through a radio medium.

Operating processes of the conventional DTV broadcasting system will be described with reference to FIG. 1 in detail. First, the broadcasting content provider 101 converts broadcasting content into a series of digital data in order to transmit the broadcasting content through a radio medium and transfers the converted digital data to the modulator 102. The modulator 102 modulates the broadcasting data based on a predetermined modulation method and transfers the modulated digital data to the DTV transmitter 103. The modulation method can be selected among an 8-VSB method, a COFDM method, and the like, according to the transmission method. The DTV transmitter 103 converts the broadcasting data received from the modulator 102 according to a DTV standard and transfers the converted broadcasting data to the transmission antenna 104. Here, the DTV standard means a standard of frequency, bandwidth and transmission speed, and the like. The transmission antenna 104 transmits the broadcasting data received from DTV transmitter 103 to a receiver through the radio medium.

FIG. 2 is a block diagram illustrating DTV reception system for receiving a DTV broadcasting signal.

FIG. 2 shows a receiver corresponding to a transmitter of DTV broadcasting system of FIG. 1. The DTV reception system of FIG. 2 is the same structure with prior DTV reception system for receiving a DTV broadcasting signal. The DTV reception system includes a reception antenna 201, a DTV receiver 202, a demodulator 203, a monitor 204 and a speaker 205.

Operating processes of the receiver of broadcasting system will be described with reference to FIG. 2 in detail. The reception antenna 201 receives broadcasting content transmitted from the transmitter of FIG. 1 and transfers the received broadcasting content to DTV receiver 202. The DTV receiver 202 outputs a DTV broadcasting signal of the selected channel. The demodulator 203 demodulates the DTV broadcasting signal by the same method as the modulation method used in the modulator 102 of the DTV transmission system, and extracts broadcasting content in the selected DTV broadcasting signal. The broadcasting content including video data and audio data is transferred to a viewer. The monitor 204 transfers the video data to the viewer, and the speaker 205 transfers the audio data to the viewer.

As mentioned above, the digital broadcasting system is enabled to transmit/receive the various additional signals by using a wide bandwidth.

Meanwhile, a country basic industrial net has various infrastructures. The infrastructure includes various systems and services, e.g., streetlights and traffic lights. The infrastructure is controlled by a predetermined method. For example, a control method of the streetlight will be described. On/off of the streetlight is controlled based on a sensor or a separate communication network. The control method using the sensor has a defect that error is large according to change of weather, climate and season. The control method using the separate communication network has a defect that initial installation cost or operational expense increases. A system or method that can control various infrastructures included in the basic industrial net efficiently is required.

DISCLOSURE

Technical Problem

An embodiment of the present invention is directed to an apparatus and system for controlling an infrastructure using a broadcasting network.

Another embodiment of the present invention is directed to an apparatus and system for controlling an infrastructure which can be easily embodied.

Another embodiment of the present invention is directed to an apparatus and system for reducing initial installation cost and operational expense.

Other objects and advantages of the present invention can be understood by the following description, and become apparent with reference to the embodiments of the present invention. Also, it is obvious to those skilled in the art of the present invention that the objects and advantages of the present invention can be realized by the means as claimed and combinations thereof.

Technical Solution

In accordance with an embodiment of the present invention, there is provided an apparatus for transmitting broadcasting content including a control signal in a broadcasting network, including: a modulator configured to modulate broadcasting content by a predetermined modulation method; a control signal generator configured to generate a control signal for remote control of infrastructure; an adder configured to add the control signal to the modulated broadcasting content; and a DTV transmitter configured to convert the added signal to a DTV broadcasting signal and transmit the DTV broadcasting signal.

In accordance with another embodiment of the present invention, there is provided an apparatus for receiving a control signal to control infrastructure, including: a DTV signal receiver configured to receive a DTV broadcasting signal including a control signal, tune and output a predetermined channel of the DTV broadcasting signal; a control signal extractor configured to extract only the control signal from the tuned signal; and a remote controller configured to provide the extracted control signal to a controller for controlling the infrastructure.

In accordance with another embodiment of the present invention, there is provided an apparatus for transmitting broadcasting content including a control signal in a broadcasting network, the apparatus including: a broadcasting content provider configured to receive broadcasting content and transform the broadcasting content to transport stream (TS) format; a control signal generator configured to generate the control signal having the TS format for controlling infrastructure; a TS multiplexer configured to receive and multiplex the broadcasting content and the control signal; and a broadcasting transmitting unit configured to modulate the multiplexed signal based on a predetermined method, convert the modulated signal to a digital television (DTV) broadcasting signal, and transmit the converted DTV broadcasting signal.

In accordance with another embodiment of the present invention, there is provided an apparatus for receiving a signal to control infra, including: a DTV signal receiver configured to receive a DTV broadcasting signal including a control signal, tune a predetermined channel of the DTV broadcasting signal, and demodulate the predetermined channel of the DTV broadcasting signal; a control signal extractor configured to demultiplex the demodulated signal by TS form and extract the control signal for controlling the infrastructure; and a remote controller configured to provide the control signal extracted in the extractor.

In accordance with another embodiment aspect of the present invention, there is provided a system for controlling infrastructure by using a broadcasting network, including: a transmitter configured to modulate broadcasting content to be transmitted to the broadcasting network, add a control signal for controlling the infrastructure to the broadcasting content, convert the added signal to a DTV broadcasting signal, and transmit the DTV broadcasting signal; and a receiver configured to receive the broadcasting content including the control signal, tune a predetermined channel of the DTV broadcasting signal, extract only the control signal from the tuned signal, and provide the extracted control signal to a controller for controlling the infrastructure.

In accordance with another embodiment of the present invention, there is provided a system for controlling infrastructure by using a broadcasting network, including: a transmitter configured to receive broadcasting content, transform the broadcasting content to be transmitted as a transport stream (TS) format, generate the control signal for controlling the infrastructure as the TS format, multiplex the broadcasting content and the control signal, modulate the multiplexed signal based on a predetermined method, convert the modulated signal to a DTV broadcasting signal, and transmit the DTV broadcasting signal; and a receiver configured to receive DTV broadcasting signal, tune and demodulate a predetermined channel of the DTV broadcasting signal, demultiplex the demodulated signal into the broadcasting content and the control signal by TS form, extract the control signal for controlling the infrastructure, and provide the control signal to a controller for controlling the infrastructure.

Advantageous Effects

An apparatus and system for controlling an infrastructure in accordance with the present invention can controls a remote control target existing in wide region by using a simple receiver for extracting a control signal inserted in a DTV broadcasting signal without installing a communication network for remote control.

BEST MODE FOR THE INVENTION

If further detailed description on the related prior arts is determined to obscure the point of the present invention, the description is omitted.

The present invention relates to a method for controlling country infrastructure facilities by remote. Hereafter, preferred embodiments of the present invention will be described in detail with reference to the drawings.

Figure 1:
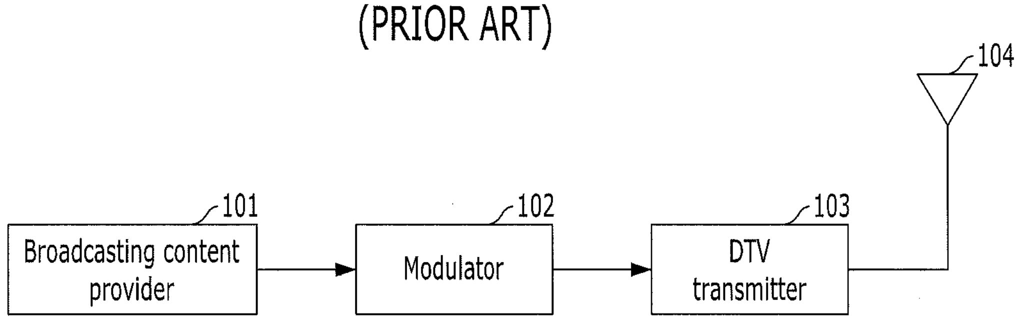
FIG. 1 (PRIOR ART)
FIG. 1 is a block diagram illustrating a DTV transmission system for transmitting a DTV broadcasting signal.
Figure 2:
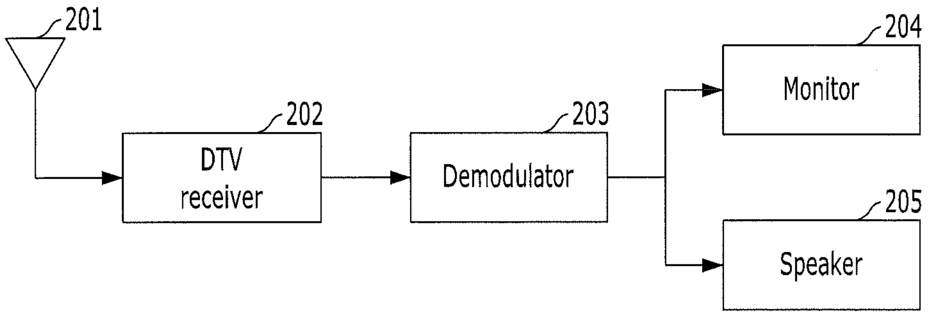
FIG. 2 (PRIOR ART)
FIG. 2 is a block diagram illustrating a DTV reception system for receiving a DTV broadcasting signal.
Figure 3:
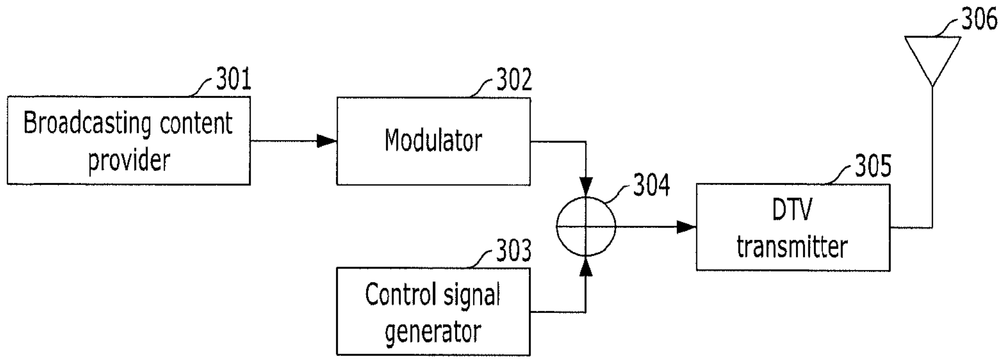
FIG. 3 is a block diagram illustrating a DTV transmission system including an infra control signal in accordance with an embodiment of the present invention.

FIG. 3 is a block diagram illustrating a DTV transmission system including an infra control signal in accordance with an embodiment of the present invention. Operating processes of the DTV transmission system including an infra control signal will be described with reference to FIG. 3.

As shown, a DTV transmission system for transmitting a DTV signal including an infra control signal includes a broadcasting content provider 301, a modulator 302, a control signal generator 303, an adder 304, a DTV transmitter 305 and a transmission antenna 306.

A content provider products broadcasting content to be broadcasted and provides the produced broadcasting content to a broadcasting company. Then, the broadcasting content provider 301 in the broadcasting company or a transmitting station for transmitting a broadcasting signal selects content to be transmitted among the produced broadcasting contents based on the transmission time and outputs the selected content. The broadcasting content outputted from the broadcasting content provider 301 is transferred to the modulator 302. The modulator 302 modulates the broadcasting content received from the broadcasting content provider 301 based on a predetermined modulation method and outputs the modulated broadcasting content to the adder 304. Here, the modulation method can be selected based on a transmission method and may be an 8-VSB method, a COFDM method or another modulation method.

The adder 304 adds a control signal generated in the control signal generator 303 to the modulated broadcasting content received from the modulator 302 and outputs a broadcasting signal including the control signal. The broadcasting signal including the control signal outputted from the adder 304 is inputted to the DTV transmitter 304. Therefore, the DTV transmitter 305 outputs the broadcasting signal including the control signal through the adder 304 as a territorial DTV broadcasting signal. The transmission antenna 306 transmits the outputted territorial DTV broadcasting signal in a broadcasting zone as a Radio Frequency (RF) signal.

Next, the control signal generator 303 in accordance with one embodiment of the present invention will be described. The control signal generator 303 generates a control signal for remote control of the country infrastructure. For example, the control signal may be an on/off control signal of a streetlight and/or a control signal of a traffic light. Besides, control signals for various elements established as the country infrastructure can be generated and transmitted. Hereinafter, the on/off control of the streetlight will be described hereinafter as an example.

The control signal generator 303 generates a control signal as following cases. First, the control signal is generated according to the predetermined time. The control signal is generated for managing objects fixed at the predetermined location such as a streetlight at the predetermined time based on predetermined information. Second, the control signal is necessary according to weather change. The control signal can be different according to brightness of light due to change of season. Also, the control signal can be generated by a manager in the case of natural weather change such as sudden heavy rain, heavy snow, flood, typhoon, and, the like. Third, the control signal is necessary for an operator to manage a network at urgency. The control signal is generated by the operator at urgency situation, e.g., accident and fire.

Figure 4:
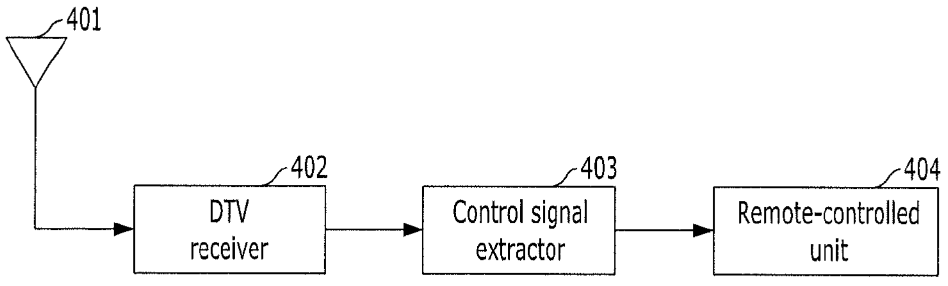
FIG. 4 is a block diagram illustrating a receiver for extracting a control signal inserted to a DTV broadcasting signal in accordance with an embodiment of the present invention.

FIG. 4 is a block diagram illustrating a receiver for extracting a control signal inserted to a DTV broadcasting signal.

A reception apparatus for receiving a DTV signal containing a control signal includes a reception antenna 401, a DTV receiver 402, a control signal extractor 403 and a remote-controlled unit 404. The reception antenna 401 receives a DTV broadcasting signal and transfers the DTV broadcasting signal to the DTV receiver 402. The DTV receiver 402 outputs a DTV broadcasting signal by tuning DTV broadcasting signal of a predetermined broadcasting channel or a selected channel as mentioned above.

The DTV broadcasting signal tuned in DTV receiver 402 is inputted to the control signal extractor 403. Then, the control signal extractor 403 only extracts the control signal inserted to the DTV broadcasting signal and provides the extracted control signal to the remote-controlled unit 404.

The remote-controlled unit 404 is controlled according to the control signal provided from the control signal extractor 403. The remote-controlled unit may be country infrastructure, as mentioned above. For example, the remote-controlled unit may a streetlight, a traffic light, and the like. Each infrastructure may be controlled according to only control signal in the receiver or have a separate controller for controlling the target infrastructure based on the control signal. The case that the target infrastructure is controlled by using a separate controller will be described with reference to FIG. 7.

Figure 5:
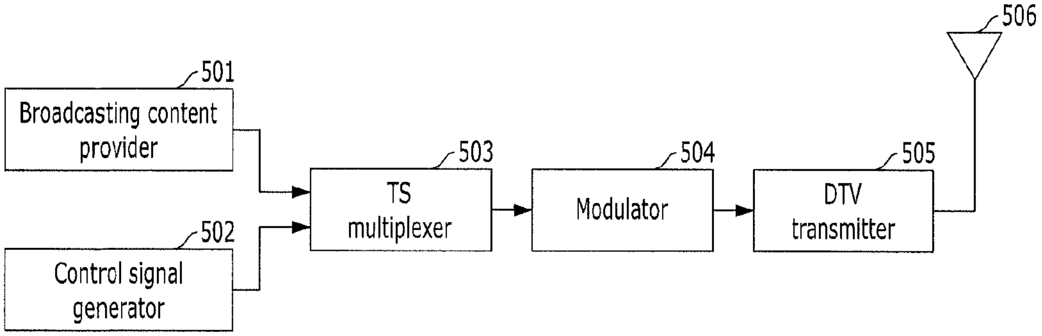
FIG. 5 is a block diagram illustrating a DTV transmission system in accordance with another embodiment of the present invention.

FIG. 5 is a block diagram illustrating a DTV transmission system in accordance with another embodiment of the present invention.

As shown, the DTV transmission system transmitting a DTV signal combined with a control signal having a Transport Stream (TS) form, includes a broadcasting content provider 501, a control signal generator 502, a TS multiplexer 503, a modulator 504, a DTV transmitter 505 and a transmission antenna 506.

Operating processes of the DTV transmission system will be described with reference to FIG. 5. A broadcasting company wanting to broadcast territorial DTV produces broadcasting content and provides the broadcasting content to the TS multiplexer 503 through the broadcasting content provider 501. The control signal generator 502 generates a control signal having the TS form for remote control and transfers the control signal to the TS multiplexer 503. The control signal generator 502 generates as following cases. First, the control signal is generated according to the predetermined time. The control signal is generated for managing objects fixed at the predetermined location such as a streetlight at the predetermined time based on predetermined information. Second, the control signal is necessary according to weather change. The control signal can be different according to brightness of light due to change of season. Also, the control signal can be generated by a manager in the case of natural weather change such as sudden heavy rain, heavy snow, flood, typhoon, and the like. Third, the control signal is necessary for an operator to manage a network at urgency. The control signal is generated by the operator at urgency situation, e.g., accident and fire.

The TS multiplexer 503 multiplexes the broadcasting content received from the broadcasting content provider 501 and the control signal of TS form outputted from the control signal generator 502, and transfers the multiplexed broadcasting content to the modulator 504. The modulator 504 modulates the multiplexed broadcasting content and the control signal based on DTV transmission method. Here, the modulation method can be decided by transmission method and may be an 8-VSB method, a COFDM method, and the like.

The broadcasting content and the control signal each having the TS form are multiplexed together and the multiplexed broadcasting content is modulated by an appropriate method to the DTV transmission method. The modulation method may be 8-VSB, COFDM, and the like.

The DTV transmitter 505 outputs the modulated signal to the transmission antenna 506. The transmission antenna 506 transmits the territorial DTV broadcasting signal outputted from the DTV transmitter 505 in a broadcasting zone as a RF signal.

Figure 6:
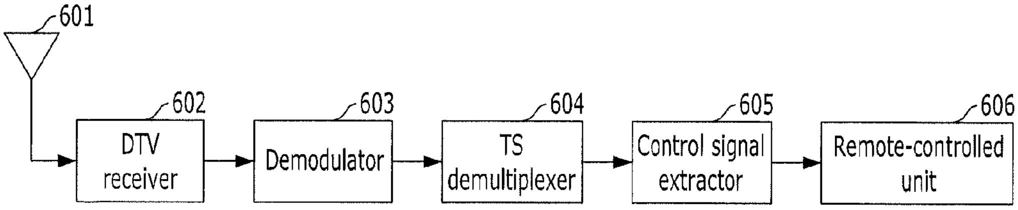
FIG. 6 is a block diagram illustrating a DTV reception system to which a control signal having a TS form is inserted in accordance with another embodiment of the present invention.

FIG. 6 is a block diagram illustrating a DTV reception system receiving a DTV broadcasting signal containing a control signal having a TS format.

As shown, the DTV reception system receiving a DTV broadcasting signal containing a control signal having a TS format includes a reception antenna 601, a DTV receiver 602, a demodulator 603, a TS demultiplexer 604, a control signal extractor 605 and a remote-controlled unit 606. Here, the DTV receiver 602 and the demodulator 603 is called as 'DTV signal receiver' and the TS demultiplexer 604 and the control signal extractor 605 is called as 'extractor'.

Operating processes of a DTV reception apparatus inserted to control signal of TS form will be described hereinafter. The reception antenna 601 receives a DTV broadcasting signal including a control signal and transfers the DTV broadcasting signal to the DTV receiver 602. The DTV receiver 602 outputs a DTV broadcasting signal of the selected channel and transfers the outputted DTV broadcasting signal to the demodulator 603. The demodulator 603 demodulates the DTV broadcasting signal received from the DTV receiver 602 based on the same method as the modulation method in the modulator 504 of FIG. 5 and transfers the demodulated DTV broadcasting signal to the TS demultiplexer 604. The TS demultiplexer 604 demultiplexer the demodulated signal from the demodulator 603 into the broadcasting content and the control signal, and transfers the broadcasting content and the control signal to the control signal extractor 605. The control signal extractor 605 extracts only the control signal of the TS format and transfers the extracted control signal to the remote-controlled unit 606. The remote-controlled unit 606 is controlled by remote based on the received control signal. The remote-controlled unit 606 may be infrastructure facilities such as a streetlight, a traffic light, and the like.

Figure 7:
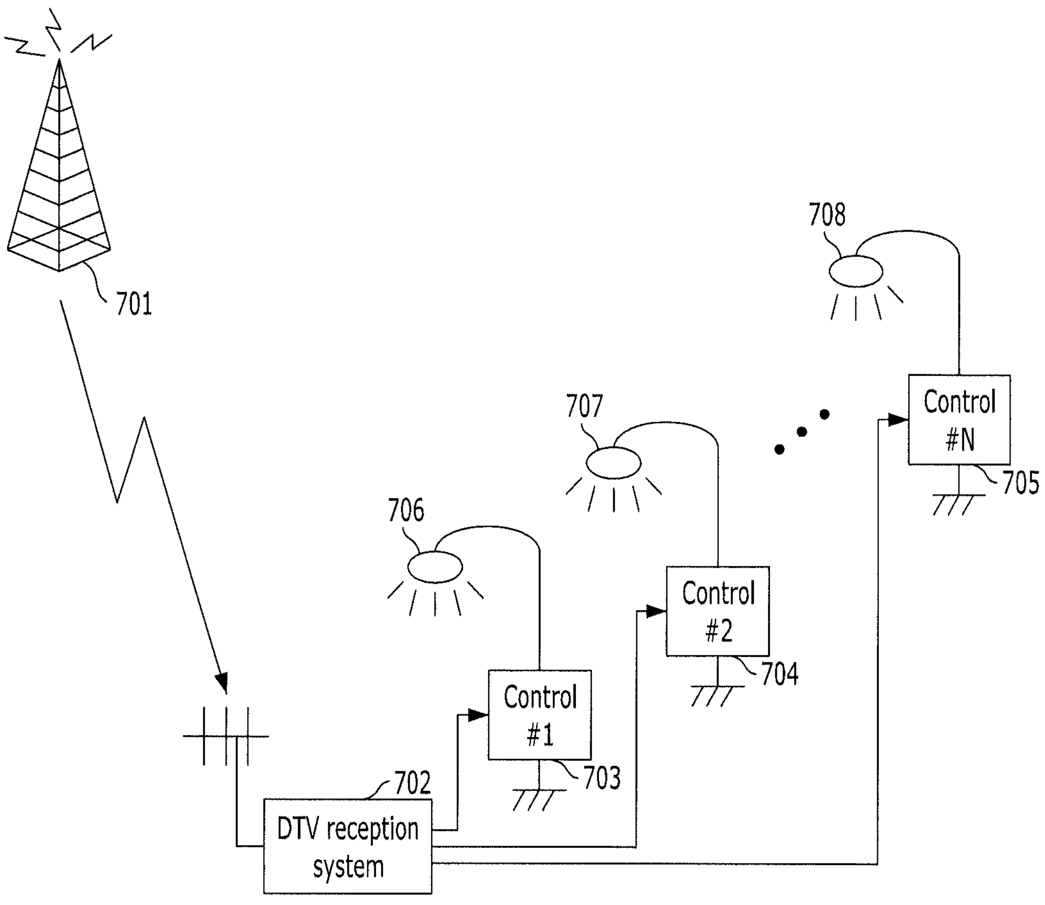
FIG. 7 is an exemplary view illustrating controlling infrastructure based on a DTV broadcasting signal containing a control signal.

FIG. 7 is an exemplary view illustrating controlling infrastructure based on a DTV broadcasting signal containing a control signal.

On/off control of a streetlight will be described as an example of infrastructure controlled based on the control signal. As shown in FIGS. 3 and 5, DTV transmission system 701 for transmitting a DTV broadcasting signal containing the control signal transmits a DTV broadcasting signal by wireless. As shown in FIGS. 4 and 6, a DTV reception system 702 for extracting a control signal inserted in the DTV broadcasting signal extracts a control signal using the transmitted signal. The control signal, which is for on/off remote control of the streetlight, extracted in the DTV reception system 702 is transferred to a Control #1 703, a Control #2 704, . . . a Control #N 705 to be a streetlight controller. On/off of each streetlight 706, 707, . . . 708 is controlled by the control signal received from the Control #1 703, the Control #2 704, . . . , the Control #N 705.

As described the above present invention, when a country infrastructure is controlled by using a broadcasting network, e.g., DTV, a new communication network or a human power to control a country infrastructure is not needed. Therefore, the present invention saves the initial facility investment and operational expense and increases efficiency of territorial DTV network.

The present application contains a subject matter related to Korean Patent Application Nos. 10-2008-0121195 and 209-0038475 filed with the Korean Intellectual Property Office on Dec. 2, 2008 and Apr. 30, 2009, the entire contents of which is incorporated herein by reference.

While the present invention has been described with respect to the specific embodiments, it will be apparent to those skilled in the art that various changes and modifications may be made without departing from the spirit and scope of the invention as defined in the following claims.

What is claimed is:

1. An apparatus for transmitting broadcasting content including a control signal in a broadcasting network, comprising:

a modulator configured to modulate broadcasting content by a predetermined modulation method;

a control signal generator configured to generate a control signal for remote control of infrastructure, the infrastructure being remote from a receiver of the control signal;

an adder configured to add the control signal to the modulated broadcasting content; and a DTV transmitter configured to convert the added signal to a DTV broadcasting signal and transmit the DTV broadcasting signal, wherein the infrastructure includes a streetlight or a traffic light.

2. The apparatus of claim 1, further comprising:

a broadcasting content provider configured to provide the broadcasting content to be transmitted based on transmission time to the modulator.

3. The apparatus of claim 1, wherein the control signals on/off of the streetlight or the traffic light.

4. An apparatus for receiving a control signal to control infrastructure, comprising:

a DTV signal receiver configured to receive a DTV broadcasting signal including a control signal, tune and output a predetermined channel of the DTV broadcasting signal;

a control signal extractor configured to extract only the control signal from the tuned signal; and a remote controller configured to provide the extracted control signal to a controller for controlling the infrastructure, the infrastructure being remote from the DTV signal receiver, wherein the infrastructure includes a streetlight or a traffic light.

5. The apparatus of claim 4, further comprising:

the controller configured to receive the control signal from the remote controller that receives the control information signal extracted from the control signal extractor, and control the infrastructure.

* * * * *